Jan. 21, 1958     D. C. APPS     2,820,361
TIRE THUMP MEASURING APPARATUS
Filed May 10, 1955     2 Sheets—Sheet 1
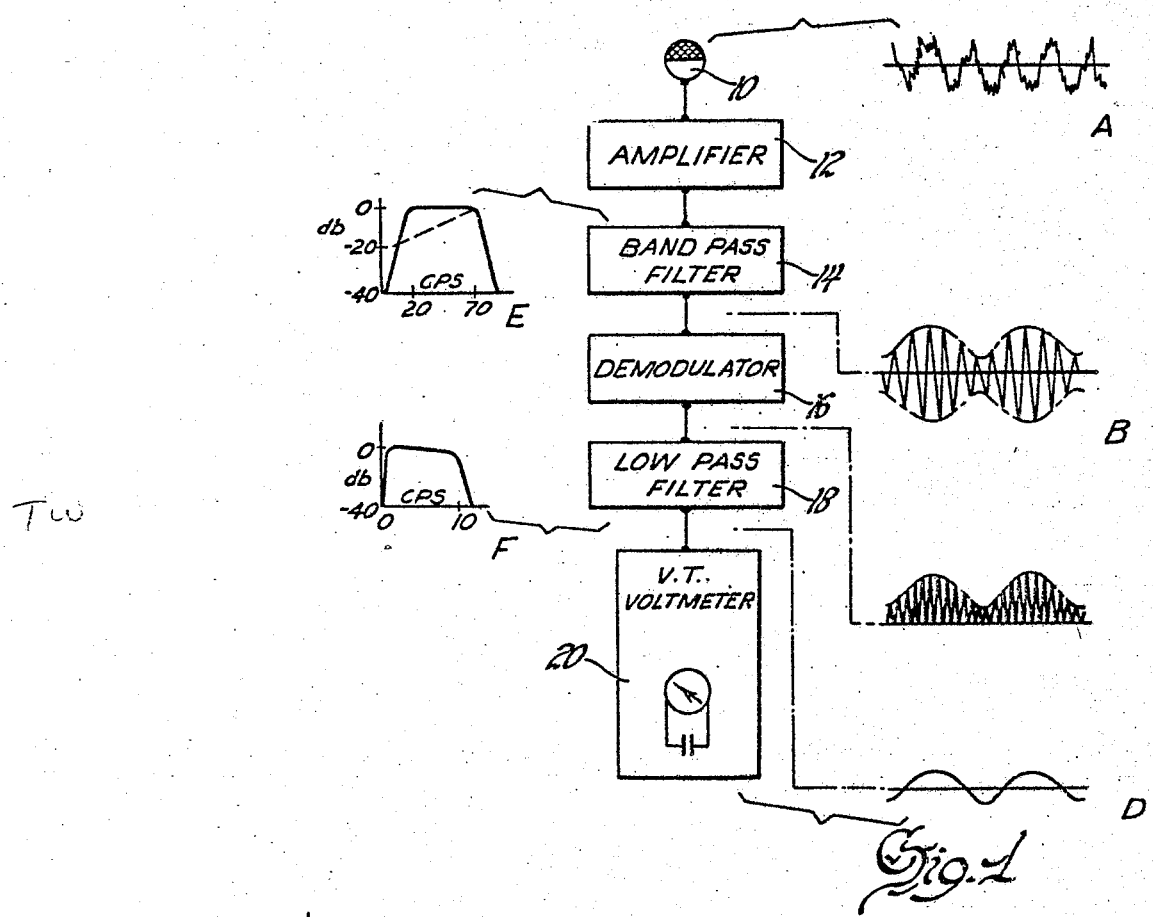
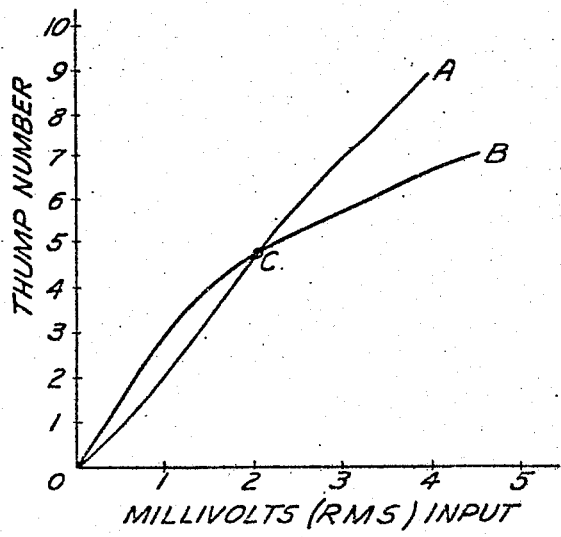

Jan. 21, 1958 — D. C. APPS — 2,820,361
TIRE THUMP MEASURING APPARATUS
Filed May 10, 1955 — 2 Sheets-Sheet 2

INVENTOR.
David C. Apps
BY E. W. Chr[ister]
ATTORNEY

United States Patent Office 2,820,361
Patented Jan. 21, 1958

2,820,361

TIRE THUMP MEASURING APPARATUS

David C. Apps, Milford, Mich., assignor to General Motors Corporation, Detroit, Mich., a corporation of Delaware Application May 10, 1955, Serial No. 507,314

3 Claims. (Cl. 73—67)

This invention relates to an improved tire thump measuring apparatus of the character described in my copending application S. N. 309,124 filed on September 11, 1952, now Patent No. 2,735,292, of which this application is a continuation in part.

As described in the above application, "tire thump" is an acoustical disturbance which occurs over a portion of the operating speed range of a motor vehicle and is most readily heard when travelling down a smooth tarvia road as one thump for each wheel revolution, much as if a boot were present in one of the tires. This disturbance is attributed to the vehicle tires and is due to the simultaneous excitation of at least two audio frequency sound components which are adjacent harmonics of wheel rotational speed and which have approximately equal sound pressure amplitudes. These components interfere with each other and produce a beat frequency equal to wheel rotational speed, which is heard as tire thump.

The foregoing analysis suggested that tire thump could be measured by measuring the amplitude or depth of modulation of the beat between two such interfering frequency components. Accordingly, an instrument was devised that separated the interfering wheel rotational frequency components from the other vibrations produced by a vehicle, detected the modulation envelope of the beat resulting from these components and displayed the amplitude of the modulation envelope on an indicating instrument having an arbitrary scale expressed in terms of thump number. It was reasoned that this reading would be directly related to the personal rating that an average individual would place upon thump.

Based upon a number of psychoacoustic tests in which the characteristics of human response associated with the hearing of beats were investigated, it was found that the sensitivity of the human ear varies with changes in the frequencies of the interfering components, with changes in the frequency of the beat frequency and with changes in amplitude of two interfering components of unequal pressure amplitudes. As a result of these tests it was found desirable to incorporate several unusual response characteristics in the predemodulation, demodulation, and post demodulation stages of the measuring apparatus in order to provide an accurate instantaneous correlation of the displayed values of tire thump with the personal reaction of an individual observer to thump over a wide variety of conditions.

Accordingly, the present invention has for its general object to provide an improved tire thump measuring apparatus. More specifically the invention seeks to provide a design for such measuring apparatus that takes into account the aforesaid psychoacoustic characteristics so that the tire thump values measured and displayed by the instrument will more accurately conform to the reaction of the human ear to tire thump over a wide variety of conditions.

The manner in which these objects are obtained will appear more fully from the following detailed description and drawings in which:

Fig. 1 is a functional block diagram of a basic form of tire thump measuring apparatus;

Figs. 1A to 1D illustrate wave forms of signals translated by different parts of the measuring apparatus of Fig. 1;

Figs. 1E and 1F illustrate preferred forms of predemodulation and postdemodulation response characteristics, in accordance with the present invention, of several parts of the apparatus of Fig. 1;

Fig. 2 illustrates a form of demodulation response characteristic embodied in another part of the apparatus of Fig. 1 in accordance with the present invention.

Figure 3:
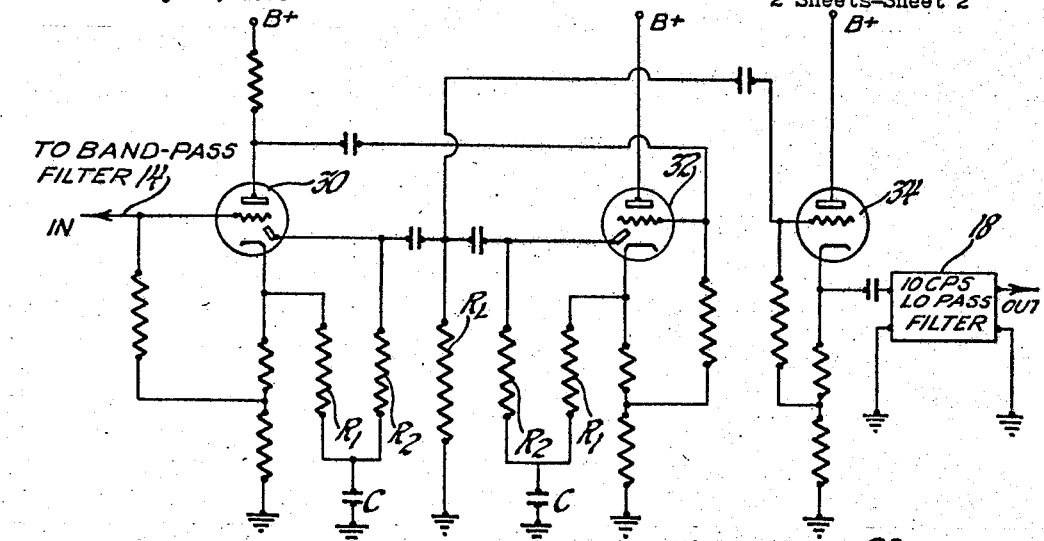
Figs. 3 and 4 are schematic circuit diagrams of suitable forms of networks that may be employed in the apparatus of Fig. 1 to provide the desired demodulation response characteristic of Fig. 2.

Referring to the drawings, there is illustrated in Fig. 1 the principal components of a tire thump meter which includes in the relative order named, a transducer 10, amplifier 12, first filter 14, demodulator 16, second filter 18 and an indicating instrument 20.

The transducer 10 may be a suitable vibration pickup, preferably, a sound microphone pickup of the crystal or condenser variety having a good low frequency response that is substantially flat over a frequency range of, say, from about 20 to 70 C. P. S. corresponding to the observed range of wheel rotational speeds (20 to 50 miles per hour) over which the aforementioned interfering higher order vibrations, which produce tire thump, are excited. The amplifier 12 is an audio frequency amplifier that would be of the resistance-coupled variety designed in accordance with conventional methods and should have a flat low end response from, say at least 20 to 70 C. P. S. The first filter 14 is a band-pass filter which is designed to pass frequencies lying in a band which extends from about 20 to 70 C. P. S.

In its simplest form, the detector 16 may be a balanced linear detector that provides full wave detection or rectification of modulated waves. The second filter 18 is a low-pass filter designed to have an upper cut-off frequency of around 10 C. P. S. which corresponds to wheel speeds of around 50 M. P. H. above which tire thump has been found to lose its low speed characteristic as far as the ear is concerned and partakes of other forms.

The indicating instrument 20 may be an A. C. vacuum tube voltmeter altered to have a long time constant to eliminate meter hand flutter and to facilitate reading at the low frequencies involved.

In the operation of the above described appaartus for the measurement of tire thump, the vehicle is driven, preferably, down a smooth tarvia road in order to reduce other disturbances to a minimum and the microphone pickup 10 is installed in the vehicle in a position at or near the ear of the driver of the vehicle. The microphone serves to sense and convert the complex sound vibration pattern produced by the vehicle into electrical waves representative thereof indicated generally at Fig. 1A. These electrical waves will include the tire thump signal carried by the principal higher order harmonic vibrations generated by the tires in addition to many extraneous vibrations produced by the vehicle. No attempt is made in the wave of Fig. 1A to accurately depict the composite form of the many components which may be present therein.

After amplification in the amplifier 12, the electrical waves are applied to the band-pass filter 14, which serves to accept and to pass therethrough all signal components lying in a band of frequencies of from about 20 to 70 C. P. S. wide and to reject the extraneous component mentioned above. Experience has indicated that tire thump is rarely conveyed by a carrier outside of this frequency range. The output of the band-pass filter may correspond to the wave form shown in Fig. 1B in which the familiar beat pattern is apparent.

The band of accepted frequencies is then demodulated or rectified by the full wave detector 16 to produce a wave illustrated in Fig. 1C having twice the frequency of the carrier of Fig. 1B. After filtering out the carrier tone or tones with the low-pass filter 18, the original envelope or contour is recovered and applied to the indicating instrument 20 to obtain a measure of the amplitude thereof. In order to prevent the D. C. component of the detector output from influencing the measurements, the low-pass filter 18 could be designed to have a lower cut-off limit of around 2 C. P. S. which is below the tire thump frequency range.

In order that the values of thump displayed on the measuring apparatus will conform more nearly to human judgment of tire thump over a wide variety of conditions, the present invention specifies the use of frequency weighting considerations in the band-pass filter 14 and the low-pass filter 18 and a demodulator having a dual response characteristic. These considerations were dictated by the following psychoacoustic tests.

It was found that when two beat component frequencies, having equal pressure amplitudes and producing a constant beat frequency of, say, 5 C. P. S., were varied in frequency over a range from 20/25 C. P. S. to 65/70 C. P. S., the beat frequency at the lower end of this frequency range sounded louder than the beat frequency at the higher end. This indicates the requirement for loudness matching or equalization over the frequency range of the beat components, and the use of a rising response characteristic in the band-pass filter 14 as indicated by the dotted line of Fig. 1E in lieu of the previously provided flat-topped response characteristic shown by the solid line. The dotted response characteristic rises at the rate of 9 db per octave and may be most readily produced by the use of a frequency selective feedback network in the band-pass filter of Fig. 1.

Some frequency weighting of the post demodulation or low-pass filter circuit 18 appears to be dictated due to the increase in ear sensitivity as the beat frequency increases in frequency. This was observed by varying two component frequencies of equal pressure amplitude about a fixed center frequency of, say, 48 C. P. S. to vary the beat frequency from about 3 to 10 C. P. S. This test indicated the use of a slightly decreasing or falling response characteristic for the low-pass filter in the nature of that shown in Fig. 1F.

The use of a dual response characteristic in the demodulator 16 was required by noting that the ear responds approximately linearly when there is an increase in the amplitudes of two beat components of equal pressure amplitudes, and non-linearly when the beat components are of unequal amplitudes. Thus, when two beat components of equal pressure amplitudes are, say, doubled in amplitude, the depth of modulation or the amplitude of the modulation envelope of the resulting beat is doubled, and the impression of thump severity to the human ear is doubled. This justifies the use of a substantially linear demodulation response characteristic as represented by the curve A of Fig. 2 under these conditions.

On the other hand, when the two frequency components producing a beat are not equal in amplitude, the impression of thump severity is not directly proportional to the depth of modulation but is a function of both the ratio of the two signal amplitudes and the depth of modulation. It is easy to show mathematically that with two signals of unequal amplitude the depth of modulation is always equal to the amplitude of the smaller signal. If then, with a linear demodulator, we start at point "C" in Fig. 2 and hold one component fixed and increase the other, the output should not increase; but again, starting at point "C," if one component is held constant and the other is decreased, the output should decrease approximately along curve A. Typical ear response measurements for unequal components, however, dictates that the demodulator response should follow along curve B for unequal components.

Figure 4:
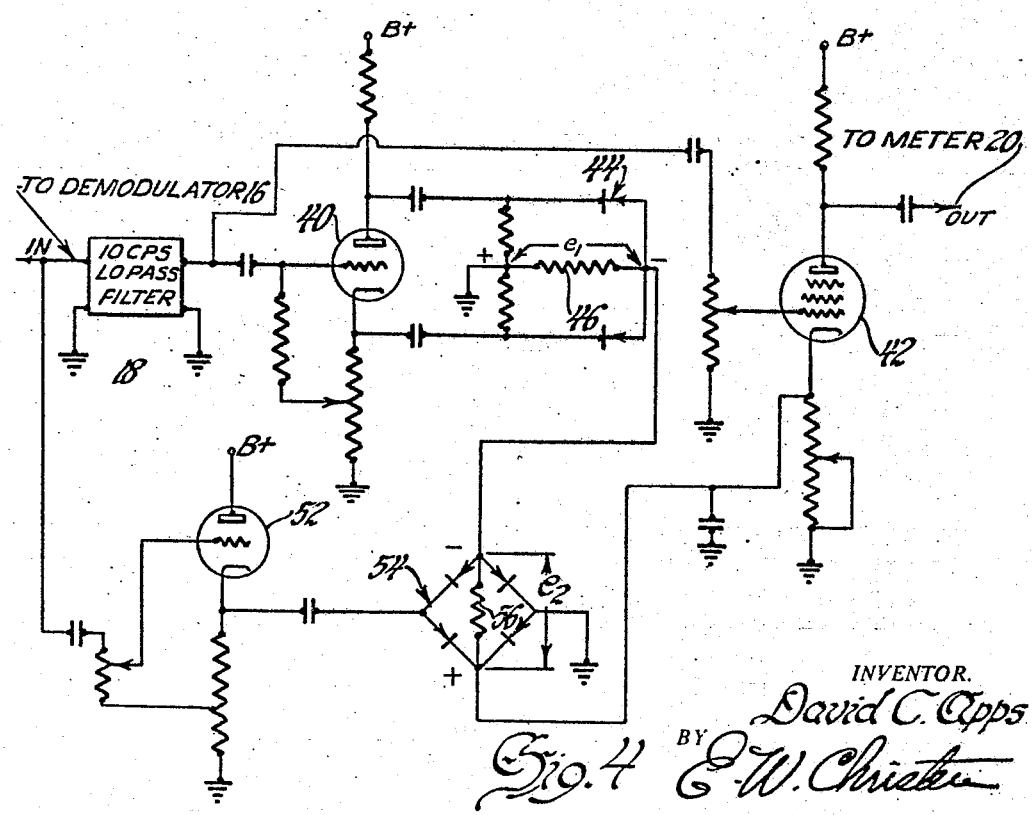

The provision of a non-linear and a linear response characteristic in the demodulator of Fig. 1 may be accomplished by the use of ratio networks, two different forms of which are illustrated in Figs. 3 and 4.

In the circuit of Fig. 3, the two diode sections of the diode-triode tubes 30 and 32 perform a full-wave rectifier function to develop the desired envelope signal across load resistor $R_L$. The triode section of tube 30 has its grid circuit connected to the output of the band-pass filter 14 and performs a phase inversion function for the diode or detector section of the tube 32 serving as one section of a balanced detector. The RC networks, which are composed of resistors $R_1$, $R_2$, and condenser C connected between the plate and cathode of each of the diodes, perform a self-biasing function on the diode plates. They operate in such a manner that as the ratio between two signals producing a beat envelope increases, that is, if one signal is held constant and the second signal is increased in level, the self-biasing action of these networks will cause an increase in the amplitude of the envelope signal. Thus, the amplitude of the envelope signal developed across load resistor $R_L$ is a function of both the amplitude of the envelope and the ratio of the amplitudes of the two signals producing the envelope. The resulting voltage developed across resistor $R_L$ is applied to triode tube 34 which is connected as a cathode follower to the input of the low-pass filter 18, whose output terminals are connected to the meter 20.

In the circuit of Fig. 4, the 10 C. P. S. low-pass filter 18 is connected to the demodulator 16 of Fig. 1 and has its output fed to a phase inverter tube 40 and also to the control grid of a variable-mu pentode tube 42. The output of the phase inverter feeds a full-wave rectifier shown at 44, which develops a D. C. voltage $e_1$ across the load resistance 46. This voltage is proportional to the amplitude of the beat envelope, since only the beat envelope appears in the output of the low-pass filter 18. The input to the filter 18 is fed to tube 52 which is connected as a cathode-follower. This signal contains both the desired beat envelope and the carrier frequency components represented. The output of the cathode-follower tube 52 is then fed to a full-wave rectifier bridge 54, which develops a voltage $e_2$ across load resistance 56. The magnitude of the voltage $e_2$ is a function of both the beat envelope and the carrier signal. The two voltages, $e_1$ and $e_2$, are connected in series-opposing and the resultant voltage is applied to the cathode of the variable-mu pentode tube 42.

Circuit constants can be so proportioned that for any condition where two voltages producing a beat signal are equal, the voltages $e_1$ and $e_2$ will also be equal and a zero resultant voltage will appear at the cathode of tube 42. If, however, one signal is held constant and the other increased, the voltage $e_2$ will exceed that of $e_1$ and a positive voltage will appear at the cathode of tube 42, increasing the gain of this tube. By proper adjustment of the difference voltage $(e_2-e_1)$ it is possible to obtain any desired response characteristic for the ratio network.

It is to be understood that the above-described arrangements are illustrative of the application of the principles of the invention. Numerous other arrangements may be devised by those skilled in the art without departing from the spirit and scope of the invention.

What is claimed is:

1. Apparatus for obtaining an objective measure of the subjective response of the normal human ear to the intensity of tire thump vibrations resulting from the beating of successive higher order vibrations which are produced by the tires of a vehicle and are harmonically related to the rotational speed of the wheels thereof, said apparatus comprising, in combination, transducer means for sensing and converting the vibrations produced by said vehicle into electrical waves representative thereof, first filter means connected to said transducer means for separating from said electrical waves components thereof lying within a frequency band corresponding to the range over which said higher order vibrations are excited and produce said tire thump vibrations, detector means connected to said first filter means for detecting the amplitude of said tire thump vibrations appearing as the modulation envelope of the beat wave occurring between said higher order vibrations, second filter means connected to said detector means effective to pass frequencies in the range over which tire thump vibrations are encountered, and indicating means connected to said second filter means, said first filter means having a response characteristic that rises with increasing frequency in accordance with the response characteristic of the normal human ear over the pass band of said first filter and said second filter means having a response characteristic that falls with increasing frequency in accordance with the response characteristic of the normal human ear over the range of tire thump vibrations, said detector means having a demodulation response characteristic that varies approximately linearly with the amplitude of said modulation envelope when components of said beat wave are of substantially equal amplitude to correspond to the response of the normal human ear to amplitude change of the equal amplitude components and that varies non-linearly when said components are of different amplitudes to correspond to the response of the normal human ear to amplitude change of said components of different amplitudes.

2. Apparatus for obtaining an objective measure of the subjective response of the normal human ear to the intensity of tire thump vibrations resulting from the beating of successive higher order vibrations which are produced by the tires of a vehicle and are harmonically related to the rotational speed of the wheels thereof, said apparatus comprising, in combination, transducer means for sensing and converting the vibrations produced by said vehicle into electric waves representative thereof, first filter means connected to said transducer means for separating from said electrical waves components thereof lying within a frequency band corresponding to the range over which said higher order vibrations are excited and produce said tire thump vibrations, detector means connected to said first filter means for detecting the amplitude of said tire thump vibrations appearing as the modulation envelope of the beat wave occurring between said higher order vibrations, second filter means connected to said detector means effective to pass frequencies in the range over which tire thump vibrations are encountered, and indicating means connected to said second filter means, said detector means having a demodulation response characteristic that varies approximately linearly with the amplitude of said modulation envelope when components of said beat wave are of substantially equal amplitude to correspond to the response of the normal human ear to amplitude change of the equal amplitude components and that varies non-linearly when the beating components are of different amplitudes to correspond to the response of the normal human ear to amplitude change of said components of different amplitudes.

3. Apparatus for obtaining an objective measurement of the subjective response of the normal human ear to acoustical vibrations produced by heterodyning action of component waves of unequal amplitude comprising means for converting the acoustical vibrations to an electrical wave having a modulation envelope corresponding to the acoustical vibrations, detector means coupled to the first mentioned means and including circuit means responsive to the amplitude ratio of said component waves for modifying the output voltage of the detector means in a non-linear manner to correspond with the response of the normal human ear to amplitude change of said component waves of unequal amplitude, and indicating means connected with the detector means and responsive to said output voltage.

References Cited in the file of this patent

Article by H. H. Scott, "Noise in Industry" in pub. "Instruments," September 1937 issue, pp. 231–236.

U. S. DEPARTMENT OF COMMERCE
PATENT OFFICE

CERTIFICATE OF CORRECTION

Patent No. 2,820,361      David C. Apps      January 21, 1958

It is hereby certified that error appears in the printed specification of the above numbered patent requiring correction and that the said Letters Patent should read as corrected below.

Column 3, line 27, for "lower" read -- higher --; line 29, for "higher" read -- lower --; line 41, for "increase" read -- decrease --.

Signed and sealed this 10th day of June 1958.

(SEAL)
Attest:

KARL H. AXLINE
Attesting Officer

ROBERT C. WATSON
Commissioner of Patents